May 28, 1957  E. T. JOHNSON ET AL  2,793,483
TRACTOR MOUNTED MOWER ASSEMBLY WITH COUNTERBALANCING
AND OVERLOAD RELEASE MEANS
Filed June 14, 1954  3 Sheets-Sheet 2
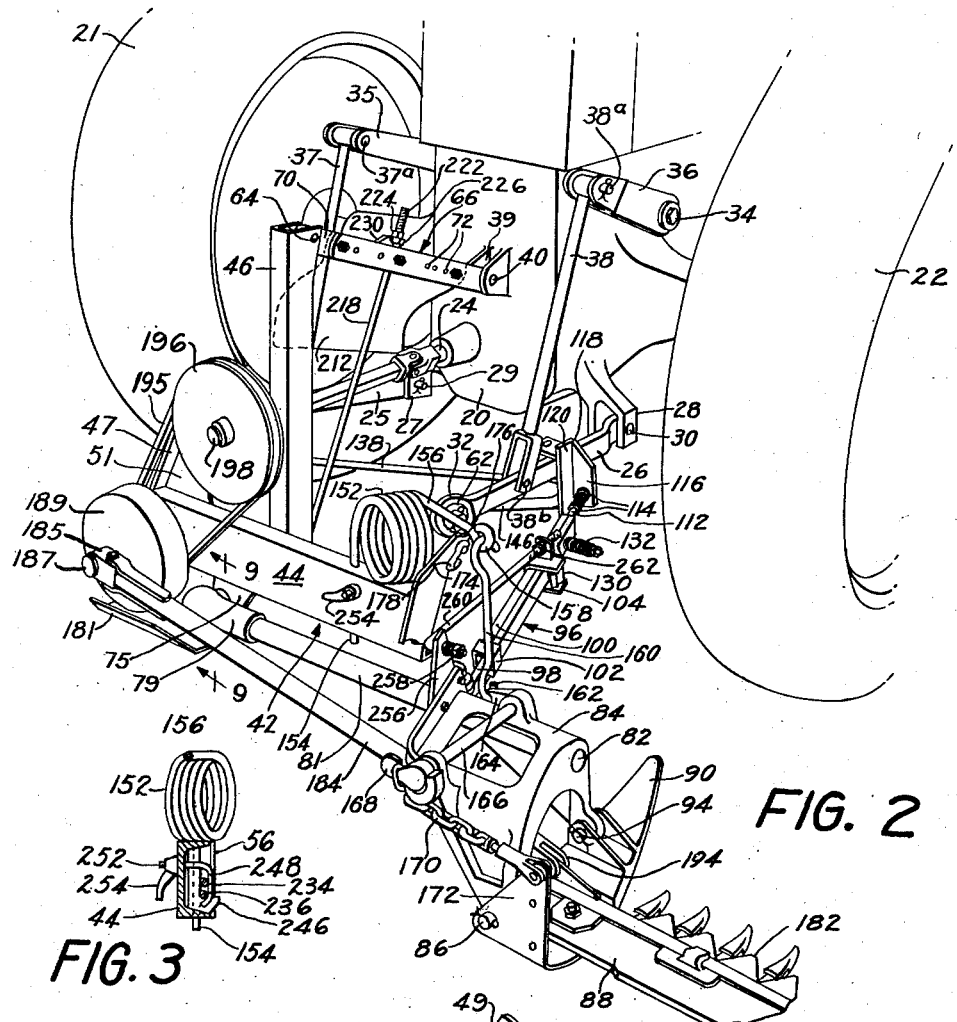
FIG. 2
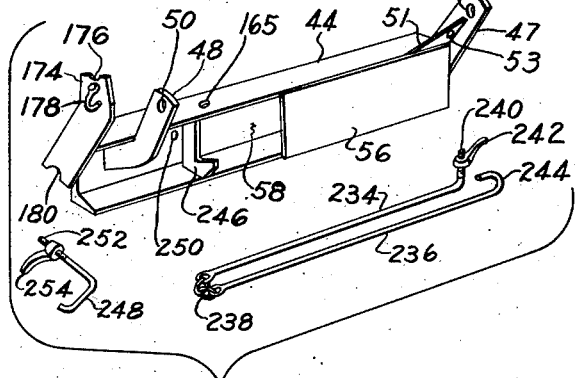
FIG. 3
FIG. 4
INVENTORS
E.T. JOHNSON &
P.H. WESTERLUND May 28, 1957  E. T. JOHNSON ET AL  2,793,483
TRACTOR MOUNTED MOWER ASSEMBLY WITH COUNTERBALANCING
AND OVERLOAD RELEASE MEANS
Filed June 14, 1954  3 Sheets-Sheet 3
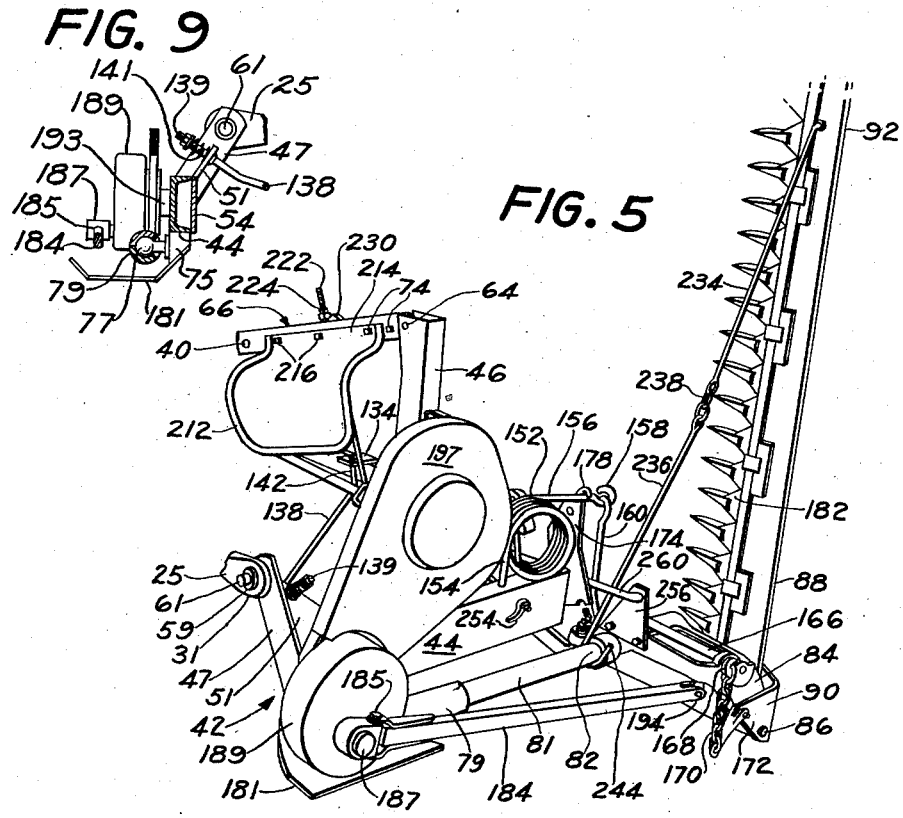
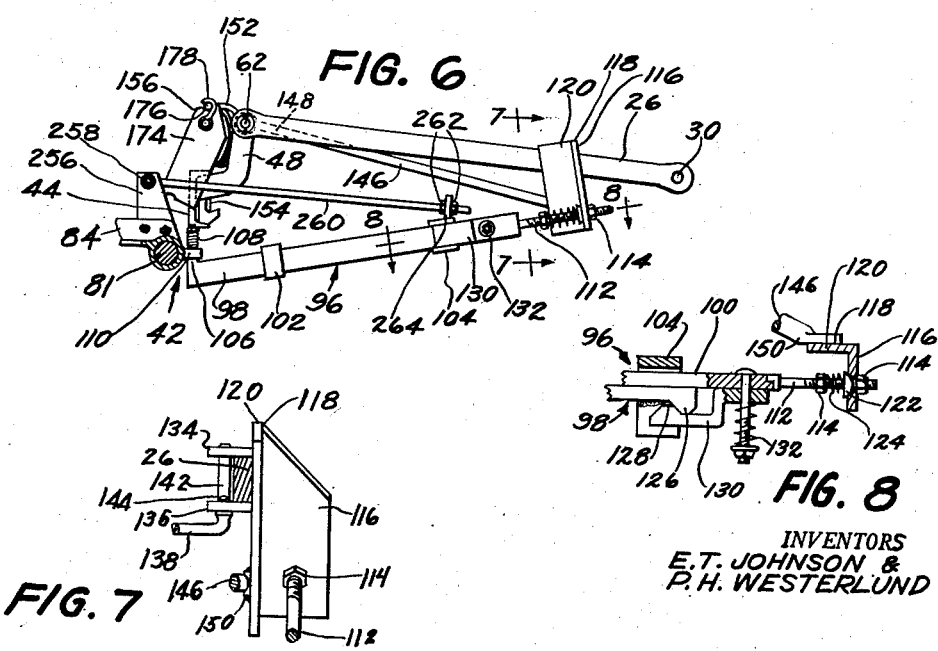
INVENTORS
E. T. JOHNSON &
P. H. WESTERLUND United States Patent Office 2,793,483
Patented May 28, 1957

2,793,483

TRACTOR MOUNTED MOWER ASSEMBLY WITH COUNTERBALANCING AND OVERLOAD RELEASE MEANS

Ellsworth T. Johnson and Paul H. Westerlund, Moline, Ill., assignors to Deere & Company, Moline, Ill., a corporation of Illinois Application June 14, 1954, Serial No. 436,564

17 Claims. (Cl. 56—25)

This invention relates to an agricultural implement and more particularly to an implement of the mower type attachable to and detachable from a tractor. Still more specifically, the invention pertains to a mower usable with a tractor of the so-called three-point-hitch type.

A tractor of the general character referred to comprises a longitudinal body having rear-mounted draft structure including a pair of laterally spaced apart and rearwardly extending draft links, the rear ends of which provide first and second hitch points. A portion of the tractor body at a level above and centrally between the draft links has a third hitch point, and various types of implements can be attached to tractors of this type, provided that the implements are equipped with the necessary attaching elements corresponding and connectible to the three hitch points. Such tractor also includes a built-in power lift system of the type including a hydraulically powered rockshaft having rearwardly extending arms connectible respectively to the draft links, rotation of the rockshaft resulting in raising and lowering of the draft links and consequently raising and lowering of whatever implement is attached thereto. An upright support on the implement will be connected by a top or upper link to the third hitch point, and vertical movement of the implement will be controlled by the substantially parallel linkage effected by the top link and the two lower draft links.

Three-point hitches and power control thereof of the character referred to above were designed in the first instance for use with tillage implements, producing many features having certain advantages and disadvantages under the general heading of "Draft control." In other types of implements, such as the mower, there is no need for the draft control feature and all that is required is that the mower be capable of being raised and lowered between transport and operating positions. Another distinction between tillage implements and harvesting implements is that few if any tillage implements have drivable parts comparable to the cutting mechanisms of a mower, for example. Such cutting mechanism will be connnected by an input shaft to the power take-off shaft of the tractor and, of course, as the vertical position of the mower is changed, the angles of the various universal joints will be affected. One of the problems in the use of a mower on a tractor of the three-point-hitch type flows from the fact that the range of vertical movement is so great as to impose impossible angles on the drive shaft. According to the present invention, this problem is eliminated by the provision of a mower attachment in which the mower frame is so constructed that the range of lift movement is reduced consonant with the maximum angularity permitted in the drive shaft.

Another feature of the present invention resides in a mower or implement attachment in general that may be readily attached to and detached from a tractor, the mower or implement structure being largely self-contained and the attaching parts being such that no modifications are required in the tractor when the mower or implement is used with the tractor. In the case of a mower, it is a specific feature to utilize a break-back or overload release cutting mechanism associated with the draft link structure in such manner that the overload release means is connected directly to one of the draft links and not to the tractor, thereby eliminating the need for additional supporting and mounting brackets. The mower is further characterized by a fore-and-aft brace means extending between the mower frame and the overload release means so as to fix the position of the overload release means without the need for clamps or lugs on the draft link. The mower also incorporates a diagonal brace that is in turn connected between an opposite corner of the mower frame and the overload release means, one end of the diagonal brace being used as part of the means for mounting the overload release means on the draft link.

One of the characteristics of a successful mower is that the cutting mechanism be allowed to float free of the mower frame, within limits, during operation. It is desirable that this floating movement be controlled in some manner, as by a spring. According to the present invention, the mower utilizes a torsion spring having opposite legs, one of which is mounted on the mower frame and the other of which extends laterally in cantilever fashion and is connected to resiliently support the cutting mechanism about its fore-and-aft pivot axis. It is a further feature of the invention to utilize a lock device for locking out the spring when the mower is in transport position.

The invention has for other objects and features the provision of a novel transport connection between the raised cutter bar and the drag bar; the foldability of the transport means by providing it in the form of a pair of articulately interconnected rods that may be folded to one half the length of the extended rods; to provide means in the mower frame for storing the rods; and in general to establish a design that may be readily manufactured, easily and efficiently operated, and economically maintained.

The foregoing and other important objects and desirable features inherent in and encompassed by the invention will become apparent as a preferred embodiment of the invention is disclosed in detail in the following detailed description and accompanying sheets of drawings, the several figures of which will be described immediately below.

Fig. 2 is another perspective view, as seen largely from the rear and from the right side of the machine.

Fig. 3 is a fragmentary sectional view on the line 3—3 of Fig. 1.

Fig. 4 is an exploded perspective view showing the mower frame and the storage of the folded transport rod.

Fig. 5 is a perspective view of the mower with the cutter bar in its transport position.

Fig. 6 is a longitudinal sectional view as seen substantially along the line 6—6 of Fig. 1.

Fig. 7 is an enlarged fragmentary sectional view as seen on the line 7—7 of Fig. 6.

Fig. 8 is an enlarged sectional view as seen along the line 8—8 of Fig. 6.

Fig. 9 is a sectional view as seen along the line 9—9 of Fig. 2.

Fig. 10 is a fragmentary view showing the relationship between the mower frame and the upper or top link.

Figure 1:
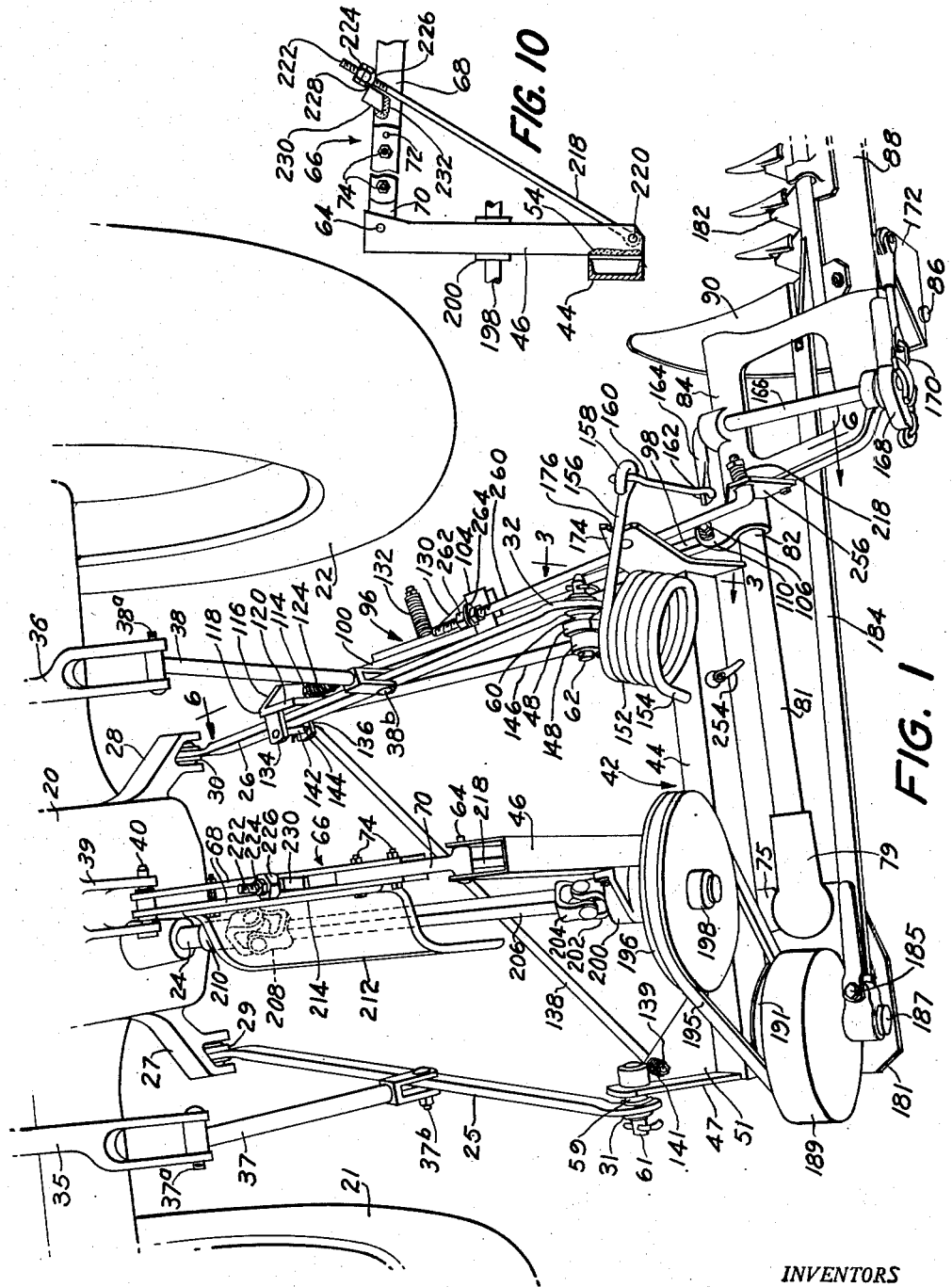
Fig. 1 is a perspective view of the mower illustrated in connection with the rear portion of a tractor.

The tractor chosen for the purposes of illustration may be recognized as a popular commercial type and comprises essentially a longitudinal main body 20 carried on left- and right-hand traction wheels 21 and 22. As original or optional equipment, the tractor is equipped with a rearwardly extending power take-off shaft 24 and with rear-mounted multi-link draft structure comprising first and second or left-hand and right-hand rearwardly extending draft links 25 and 26. The tractor body has left- and right-hand supporting lugs 27 and 28 to which the forward ends of the draft links 25 and 26 are respectively pivotally connected, as at 29 and 30. The connections at 29 and 30 are normally articulate, preferably using ball and socket means (not shown, since such connections are conventional) and therefore the links may have lateral movement as well as vertical movement. The rear ends of the draft links are in transverse alinement and provide first and second or left-hand and right-hand hitch points 31 and 32 respectively.

Also as part of the original or optional equipment of the tractor is a transverse rockshaft 34 on which are carried left- and right-hand lift arms 35 and 36. The rockshaft may be powered by any suitable power means contained in the tractor body, many forms of which are familiar to those skilled in the art and therefore need not be further described here. Vertical movement of the lift links 25 and 26 in unison by means of the lift arms 35 and 36 is accomplished by left- and right-hand lift links 37 and 38.

In addition to the first and second hitch points 31 and 32 afforded by the rear ends of the draft links 25 and 26, the tractor has a third hitch point 39, here shown as taking the form of a transversely apertured lug means incorporating a removable connecting pin 40. In the conventional type of draft control tractor, the lug 39 will be part of a load-control spring, the details of which are unimportant here. Pivots are used freely throughout the draft structure, such as at 37a, 38a, 37b and 38b, at opposite ends respectively of the lift links 37 and 38. Because of the ball and socket joints at 29 and 30 and because of the free pivots at 37a, 38a, 37b and 38b, the draft structure comprising the links 25 and 26 is articulate or swingable in a lateral direction as well as being capable of being raised and lowered by the lift arms 35 and 36.

The improved mower or implement main frame, designated generally by the numeral 42, is, since it is carried by the tractor, a mobile supporting frame and comprises a transverse frame member 44 to which is rigidly secured upright means in the form of a mast or columnar frame member 46, the arrangement giving the frame structure 42 the form of an inverted T.

The transverse member 44 has at its opposite ends respectively first and second or left-hand and right-hand hitch elements 47 and 48, these elements rising or being upstanding from the member 42 and being apertured in transverse alinement as at 49 and 50 so that the transverse common axis of the apertures 49 and 50 is at a level appreciably above the general level of the member 44. The members or elements 47 and 48 are integral with the member 44 in the sense that they are rigidly united therewith, as by welding. The left-hand element 47 is braced to the member 44 by a triangular gusset 51 which has an aperture 53 therein, for purposes to presently appear. The upright member 46 is also rigidly united with the member 44, being preferably welded thereto at its lower end, as shown at 54 in Fig. 10. The member 46 has been eliminated from the view in Fig. 4.

As best seen in Fig. 4, as well as in Figs. 6 and 9, the transverse member 44 is of channel-shaped cross section, having its open side toward the front. The open side is closed in part by a transverse plate 56 rigidly secured thereto, as by welding, thus leaving the right-hand portion of the front part of the member 44 open, as at 58.

The left-hand and right-hand hitch points 31 and 32 provided respectively at the rear ends of the draft links 25 and 26 include as original equipment apertured ball members 59 and 60, respectively, and these balls, together with connecting pins 61 and 62 afford left-hand and right-hand or first and second connecting means for detachably connecting the hitch elements 47 and 48 of the frame 42 to the first and second hitch points on the tractor. The pins are removable so that the mower frame 42 may be detached as a unit from the draft links 25 and 26. Since the mower frame 42 is connected to the draft links 25 and 26, it follows that the mower frame will be raised and lowered as the draft links are raised and lowered by the lift arms 35 and 36.

The upright frame member 46 has an upper end portion provided with a transverse pivot pin 64 to which is connected the rear end of a fore-and-aft extending top or upper link means 66, the forward end of which is connected by the previously described pin 40 to the third hitch point 39 on the tractor. The upper link 66 comprises relatively adjustable members 68 and 70 provided with sets of apertures, as at 72, adapted to selectively receive removable securing means in the form of bolts 74, whereby the fore-and-aft length of the link 66 may be adjusted, which consequently adjusts the distance between the pivot pins 40 and 64. The links 66—25—26 constitute substantially parallel linkage so that when the mower frame 42 is raised and lowered, it travels substantially in an upright position at all times; although, the vertical movement is not perfectly linear.

Considering the mower frame 42 to the extent described, it will be seen that it is connected to the tractor at the three points 31, 32 and 39, the connecting means comprising simply the pins 61, 62 and 40, the top link 66 constituting part of the mower attachment. Thus, at least to the extent described, no changes of any kind have been made in the basic tractor and draft structure, thus enabling the use of the mower with any type of three-point-hitch tractor, regardless of its manufacturing origin.

As best shown in Fig. 9, the transverse frame member 44 carries adjacent to its left-hand end (Fig. 1) a drag bar support 75 including a rearwardly extending ball 77 to which the stubbleward end 79 of a transverse drag bar 81 is pivotally connected, the drag bar extending transversely to the right to have at its right-hand or grassward end 82 a yoke 84 of somewhat conventional construction. This yoke mounts on a fore-and-aft extending axis, as by means of a pin 86, a laterally outwardly extending cutting mechanism 88. This cutting mechanism has its stubbleward end in the form of a shoe 90 that is connected to the yoke 84 by the previously described pin 86.

The ball and socket connection or connecting means at 77—79 establishes a universal pivot about which the drag bar may move vertically and about which the drag bar and cutting mechanism as a unit may move fore-and-aft. The cutting mechanism 88 is movable vertically relative to the drag bar 81 about the pivot 86 and may thus occupy a transport position (Fig. 5) in which the grassward end portion 92 of the cutting mechanism extends upwardly rather than laterally as in Figs. 1 and 2. The illustrations in Figs. 1 and 2 represent the operating position of the cutting mechanism. Fig. 2 better illustrates the pivotal connection between the cutting mechanism shoe 90 and drag bar yoke 84, depicting also a second pin 94 coaxial with the pivot pin 86 previously described.

The cutting mechanism 88 is maintained in its normal or operating position, extending transversely beyond the right-hand wheel 22 of the tractor, by overload release means, designated generally by the numeral 96. The particular form of release means shown here comprises first and second separable members 98 and 100, telescopically arranged by virtue of U-shaped members 102 and 104. The rear end of the member 98 is connected at 106 to forwardly extending apertured lug means 110 mounted on the drag bar yoke 84. The forward end of the other separable member 100 has a threaded extension 112 that is connected by means of nuts 114 to one flange 116 of a mounting bracket 118 having its other flange 120 abutting the outer or right-hand face of the forward portion of the right-hand draft link 26. The description immediately following will proceed on the assumption that the bracket 118 is fixed to the draft link 26 and held in some manner against rearward displacement relative to the draft link.

In order that the desired flexibility may be achieved to permit rise and fall of the cutting mechanism and drag bar, the rear end connection 106 of the releasable device 96 achieves flexibility by means of a spring 108 (Fig. 6), which functions to keep the connection tight yet permits the necessary relative movement between the components 106 and 110. Flexibility at the forward end is achieved by the interposition of a half ball 122 and a coil spring 124 between the flange 116 and the rear nut 114 (Fig. 8). During normal operation, the overload release device 96 operates as a pull link between the draft link 26 and the cutting mechanism to maintain the operating position of the cutting mechanism or cutter bar. In the event that the cutting mechanism strikes an obstruction that imposes thereon a load in excess of that for which the overload release means is set, the overload release means will release to permit longitudinal separation of the members 98 and 100, whereupon the cutting mechanism and drag bar will swing as a unit about the vertical axis afforded by the ball and socket connection 77—79. After the obstacle is removed or the cutter bar is raised over it, the cutter bar may be restored to normal operating position by restoration of the members from their extended position to their contracted position. Normal retention of the members in their contracted position is maintained by the mechanism best shown in Fig. 8, wherein it will be seen that the forward end of the member 98 that is connected to the drag bar yoke is in the form of a cam lug 126 with which cooperates a cam lug 128 on a latch member 130 spring-mounted at 132 on the forward end of the other member 100. The spring is set to maintain the latch in position so as to restrain the members against separation except in response to a load of a predetermined magnitude.

Of the two U-shaped clips, the clip 102 is secured to the rear end portion of the member 100, although it embraces the member 98 (Fig. 6). The clip 104 is secured to the front end of the member 98, although it embraces the member 100. Thus, the clips serve as means maintaining the telescoping relation of the members 98 and 100. In addition, the clips serve as interengaging stops that limit rearward travel of the cutting mechanism when it breaks away. That is to say, upon rearward swinging movement of the cutter bar and extension of the separated members 98 and 100, the front clip 104 will travel rearwardly as the member 98 travels rearwardly and will ultimately engage the clip 102 that is fixed to the rear end portion of the member 100. Any other form of overload release means may be used, that shown here being merely representative and not novel per se.

The mounting of the bracket 118 on the right-hand draft link 26 involves a novel design, including upper and lower inwardly projecting legs 134 and 136 (Fig. 7) that are apertured in vertical alinement to receive removable connecting means. The connecting means here is part of a diagonal brace 138 that has a rear end 139 received in the aperture 53 of the gusset plate 51 at the left-hand hitch element 47, as previously described. Flexibility at the connection is afforded by means of a spring 141, a construction that will be obvious without further description (Figs. 1 and 9). The forward end of the brace 138 is turned upwardly at 142 (Figs. 1 and 7) to pass through the alined apertures in the lugs or portions 134 and 136, and thus prevents lateral displacement of the bracket 118. A removable pin 144 is inserted through the upstanding portion 142 just above the lower lug 136. The right-hand draft link 26 is thus confined between the bracket 118 and the upstanding portion 142 of the diagonal brace 138. Since this brace extends diagonally across the draft structure from the rear left-hand corner to the front right-hand corner, it operates as an anti-sway brace that stabilizes the draft links 25 and 26 against lateral movement, which lateral movement would be possible because of the ball joints at 29 and 30. When it is desired to disconnect the mower from the tractor, the pin 144 is removed, and the front end of the brace 138 is dropped from its position in association with the bracket lugs 134 and 136, therefore permitting the bracket to be moved laterally outwardly to the right for separating it from the draft link 26.

It is a feature of the invention that no alterations need be made in the tractor or draft structure when the mower attachment is mounted. To this end, the bracket 116 is simply carried on the right-hand draft link 26 by means of the connection established by the forward end 142 of the diagonal brace 138, in addition to means for preventing rearward displacement of the bracket because of rearwardly directed forces transmitted to the bracket by the overload release device 96. This additional means takes the form of another brace member 146 having a rear end portion 148 apertured for connection to the right-hand hitch element by means of the pin 62 that is used to connect the mower to the right-hand draft link 26 (Figs. 1 and 6). This brace 146 extends downwardly and forwardly and has a forward end 150 rigidly united, as by welding, to the inner flange 120 of the bracket 118 (Figs. 7 and 8). The connection of the brace 146 at 148 is one of flexibility in a lateral direction so that when the front end 142 of the diagonal brace 138 is removed from the bracket lugs 134 and 136 and the bracket is moved laterally outwardly, such outward movement is permitted without interference from the brace 146. Consequently, the brace 146, like the brace 138, is part of the mower and is associated with the overload release means without modifying in any respect any of the tractor or draft structure. When the brace 146 is in place, it acts between the bracket 118 and the rear right-hand hitch element 48, by means of the connection at 62—148, to prevent rearward displacement of the bracket relative to the draft link 26.

Another novel characteristic of the mower structure is the means whereby the mower is resiliently supported from the mower frame for floating movement within limits. This means takes the form of a torsion spring 152 having first and second or vertical and horizontal legs 154 and 156, the latter having a free or outer end portion in the form of an eye 158 to which is connected a suspension link 160. The lower end of the link 160 is connected at 162 to the drag bar yoke 84. As best shown in Fig. 4, the upper flange of the transverse mower frame member 44 has therein an aperture 165 through which the vertical leg 154 of the torsion spring 142 is inserted. It will be understood that the lower flange of the member 44 has an alined aperture so that the mounting of the spring 152 is stabilized, which will be clear from Fig. 3.

The connection of the lower end of the link 160 at 162 to the drag bar yoke 84 is effected by means of a bell crank having a forward arm 164, a fore-and-aft extending rockshaft portion 166 and a rear arm 168. The arm 168 is connected by a chain 170 to an upstanding arm 172 on the cutter bar shoe 90. Consequently, when an upward pull is exerted on the link 160, the rockshaft 166 is rocked in a clockwise direction (Fig. 1) to draw on the chain 170 and consequently to tilt the cutter bar 88 about its pivot axis 86—94, a result that is not unconventional, nor is the linkage by means of which it is accomplished, other than the means including the torsion spring 152.

Because of the connection just described, the torsion spring supports the drag bar and cutter bar at the junction of the two by means of the yoke 84, the load of the spring being biased so that the arm or leg 156, which extends laterally in cantilever fashion, resiliently suspends the drag bar-cutter bar structure through the link 160 and the mechanism 164—166—168—170—172. Therefore, as the right-hand tractor wheel, for example, engages a high spot in the terrain, the cutter bar cannot drop abruptly downwardly. Similarly, the cutter bar, because of its floating mounting, is free to follow variations in terrain, within limits, of course. The operating position of the mower frame 42 as determined by the power lift means on the tractor, which includes the rockshaft 34 and lift arms 35 and 36, depends in part upon the engagement of the mower shoe 90 with the ground, the mower frame being lowered to such point as to clear the cantilever arm 156 of the spring 152 from a stop or rigid member 174 that is welded to the right-hand end of the member 44. Consequently, the cantilever arm 156 has free vertical movement in a downward direction, except as limited by the upper end portion of the stop 174, which upper end portion is in the form of a notch 176 for receiving the outer end portion of the arm 156. When the arm is received by the notch 176 in the stop 174, the arm is substantially rigidified, thus nullifying the resiliency thereof, because of the relatively short distance between the eye 158 and the portion of the arm that is engaged by the notch 176 in the stop. Therefore, when the power lift means is operated to raise the draft links and consequently to raise the mower frame 42, the increased weight of the cutting mechanism and drag bar (which will then no longer be supported in part on the ground) will cause the arm 156 to move downwardly and into engagement with the rigidifying stop 174. This position of the parts will be utilized when it is desired to transport the mower, with the cutting mechanism clear of the ground, at least horizontally or ultimately turned to the upright position of Fig. 5. In either event, the notch-received portion of the arm 156 may be locked in place by a locking device comprising a pivoted hook 178 that may be hooked over the arm 156 (Fig. 5) to prevent upward movement of the arm in the event that terrain is encountered that may cause the structure to bounce. Moreover, the notch, because of its shape, confines the arm 156 against fore-and-aft movement when it cooperates with the latch hook 178.

As best seen in Fig. 4, the lower portion of the stop 174 has a second or lower notch 180 which is engageable with the drag bar 81 when the mower is detached from the tractor and is supported wholly on the ground, the left-hand end of the ground-supported mower being then carried on a shield 181 and the right-hand end of the structure being carried on the mower shoe 90 (Figs. 1, 2 and 5).

The mounting of the torsion spring 152 accommodates the spring to rearward swinging movement of the cutting mechanism when the overload release device 96 releases, since the leg 154 of the spring is pivotally received in the apertures 165 in the frame member 44. There is sufficient swingability of the sprng 152, regardless of the length of the arm 156, to accommodate the necessary rearward swinging of the cutting mechanism to prevent damage to the mechanism in the event that an obstacle is encountered.

The cutting mechanism 88, already described, represents broadly an implement part having a drivable part, here in the form of a conventional form of reciprocating knife 182, which knife is driven by a transverse pitman 184 which has its left-hand end connected at 185 to a crank pin 187 on a flywheel 189.

The flywheel 189 includes integrally therewith a coaxial pulley 191 and the two as a unit are journaled on a dead shaft, as at 193 (Fig. 9) which shaft is rigidly secured to a left-hand portion of the transverse mower frame member 44. The pivot at 185 between the pitman 184 and the crank 187 affords sufficient flexibility to permit rearward swinging of the cutter bar without interference from the pitman, and the right-hand end of the pitman is flexibly connected at 194 to the knife 182 in such manner as to permit foldability of the cutter bar relative to the drag bar, as shown in Fig. 5. These details are largely conventional.

Drive is transmitted to the pulley 191 by means of a belt 195 and a driving sheave 196, shielded at 197 in Fig. 5 but exposed in Figs. 1 and 2. This sheave is carried on a short shaft 198 journaled in a bearing bracket 200 secured in any appropriate manner to an intermediate portion of the upright frame member 46. The forward end of the shaft 198 has secured thereto a universal joint yoke 202 which is in turn connected to a universal joint yoke 204 on the rear end of an input shaft 206, the forward end of which shaft is connectible by means of a universal joint assembly 208 and an internally splined sleeve 210 to the tractor power take-off shaft 24. The sleeve is, of course, axially removable from the power take-off shaft 24 and is part of the mower that is removed when the mower attachment is detached from the tractor.

Because of the upstanding hitch elements 47 and 48, the transverse mower frame member 44 is disposed at a relatively low level, which places the drive means 196—195—191 also at a low level so that the drive shaft 198 is substantially in horizontal and vertical alinement with the power take-off shaft 24 under normal operating conditions of the mower. Since the lift arms 35 and 36 need not be moved to their maximum downward position, their upward range during lifting is somewhat limited and the angle through which the power shafting 210—206—198 is moved is relatively small and the drive loses little if any of its efficiency even though the mower frame is raised for operation of the cutting mechanism at a higher level.

The input shafting 206 is shielded as a safety feature by means of a shield 212 having an apertured upper marginal edge portion 214 secured to the top link assembly 66 as by means of one of the bolts 74 (previously described) and one or more additional bolts as at 216.

The level to which the mower frame may be lowered is adjustably determined by a depth link 218, which has its lower end pivotally connected at 220 to the lower end of the upright member 46 (Fig. 10) and which has its upper end threaded at 222 to receiver nuts 224 and 226. The upper end portion of the link passes between the spaced apart link members 68 (Fig. 1) and the lower nut 226 has a half-ball bottom 228 engageable with a permanent stop 230 welded between the link members 68 as at 232. The depth link 218 thus establishes a diagonal across the parts 46 and 66 and the stop at 226—230 determines the level to which the mower frame may be lowered, which level may be adjusted by means of adjustment of the nuts 224 and 226 on the threaded portion 222 of the depth link 218.

When the cutter bar 88 is raised to its transport position (Fig. 5), it is conventional to use some form of means for holding it in that position. Consequently, the cutter bar is moved manually to the upright position and is here secured in place by transport means comprising a pair of interconnected rods 234 and 236, the interconnection being articulate as by means of a short length of chain 238. The rods are of substantially equal length so that when they are folded (Fig. 4) they are only half as long as they are when extended (Fig. 5). The link 234 has its free or outer end threaded at 240 to reecive a tail nut 242, and the cuter bar grassward end portion 94 is apertured as is conventional to receive the threaded portion 240. The tail nut is threaded onto the portion 240 to pervent disconnection of the link or rod 234 from the cutter bar 88. The free end of the link or rod 236 has a hook 244 thereon for hooking under the drag bar 81. In the transport or extended position of the rods 234 and 236, their first or proximate ends are relatively closely spaced apart, being held in that position by the interconnecting chain 238, the rods being thus in end-to-end prolongation. The second ends are remote from each other and are connected respectively to the cuter bar and to the drag bar as previously described.

When the rods 234 and 236 are removed from their transport position, they may be folded as shown in Fig. 4 and may be stored in the receptacle or box section afforded by the channel section of the member 44 as closed in part by the front plate 56 which, as previously described, affords the opening at 58 into which the folded rods 234—236 may be inserted, the tail nut 242 being threaded onto the portion 240 to prevent its loss. The member 44 has interiorly thereof a supporting part 246 on which the outer proximate ends of the rods 234 and 236 may rest. A hook member 248 may be inserted through an aperture 250 in the rear wall of the member 44, the outer end portion of the member 248 being threaded at 252 to receive a tail nut 254. When the member is inserted as stated, with the hook portion over the proximate ends of the rods 234 and 236, and the tail nut 254 tightened, the folded transport rod is securely stored against loss. The supporting part 246 is in close proximity to the vertically alined apertures 165 through which the vertical leg 154 of the torsion spring 152 is inserted, but the front edge of the member 246 is at least flush with or even slightly ahead of the leg 154 so that when the tail nut 254 is tightened, the rods 234 and 236 do not engage and tighten against the leg 154 of the spring 152. The hook member 248 may be carried in place by the aperture 250 in the member 44.

Another feature of the invention resides in means for adjusting the cutting mechanism about the transverse axis that constitutes the principal axis of the drag bar 81, the yoke 84 being mounted on the drag bar 81 by means permitting relative movement therebetween. Accordingly, adjustment of the yoke about the principal axis of the drag bar 81 adjusts the fore-and-aft angle of the cutting mechanism relative to the ground. This adjustment is accomplished by means of an upstanding arm 256 rigid on the yoke 84 and flexibly connected at 258 to the rear end of a forwardly extending adjusting rod 260. The forward end of the rod is adjustably connected, as by nuts 262, to a lug 264 welded to the forward clip 104 of the hitch device 96. Since the rod 260 is secured to the clip 104, there will be no interference with the rearward swinging of the cutter bar, since the clip 104 moves rearwardly when the cutter bar swings. Flexibility at the point 258 is sufficient to accommodate this swinging without undue interference. Obviously, adjustment of the nuts 262 will promote the desired angle of the cutter bar relative to the ground.

In its broader aspects, the improved mower construction is significant from the standpoint of the ease and speed with which it may be attached to and detached from the tractor and draft structure. It will be apparent from the foregoing that there are only a few mounting points; namely, supporting or draft connections at 31, 32 and 39, a bracing connection at 142, and a driving connection at 24—210, it being understood that when the front end 142 of the brace 138 is removed, it permits removal of the bracket 118 with the mower. The connection of the overload release means directly to the right-hand draft link 26 eliminates the need for providing special brackets for connecting such device to the tractor, as in prior art constructions. The over-all simplicity of the mower frame, which is in the form of an inverted T, will be apparent without further elaboration. Other important features such as the resilient foldability of the cutter bar by means of the torsion spring 152, the bracing of the break-back device by means of the brace 146, the storage of the transport rods 234—236 and other features have been covered above.

Other specific advantages and features not specifically enumerated will undoubtedly occur to those skilled in the art, as will numerous modifications and alterations in the preferred embodiment of the invention illustrated, all of which may be achieved without departing from the spirit and scope of the invention.

What is claimed is:

1. In an agricultural implement having a mobile supporting frame and an implement part having means connecting said part to the frame for vertical movement relative to said frame, the improvement residing in additional means for supporting the implement part from the supporting frame in spaced relation to the first mentioned means, comprising: a torsion spring having first and second legs, means mounting the first leg on the supporting frame, with the second leg extending generally horizontally in cantilever fashion to a free outer end, and means connecting said free outer end of second leg to the implement part for resiliently sustaining the implement part.

2. The invention defined in claim 1, including: means rigid on the supporting frame and adjacent to the free outer end of the second leg and positioned in vertically spaced relation below said end to engage said end upon predetermined downward deflection of said end and thereby to nullify the resiliency of said spring.

3. The invention defined in claim 2, including: lock means cooperative between the second leg of the spring and the rigid means and the supporting frame and operative to lock said second leg to the rigid means and thereby to prevent movement of said second leg in either vertical direction.

4. The invention defined in claim 3, in which: the rigid means has an upwardly opening notch therein, the second leg when deflected to engage said rigid means is received in said notch, and the lock means retains the notch-received leg against escape from said notch.

5. The invention defined in claim 1, wherein the first-mentioned means connecting the implement part for vertical movement includes provision for relative horizontal movement of said part about an upright pivot spaced from the spring, including: releasable overload means connected between the supporting frame and the implement part to normally prevent such horizontal movement of the implement part; the first leg of the spring is upright and engages the supporting frame pivotally to afford an upright pivot about which the spring can swing so that the second leg of the spring may move horizontally when the overload release means is released to enable horizontal swinging of the implement part.

6. The invention defined in claim 5, including: means on the supporting frame and releasably engageable with the spring to prevent horizontal pivoting of the spring about the axis of the first leg of the spring.

7. In a mower having a frame, a drag bar pivoted to the frame and cutting mechanism pivoted to the drag bar for disposition in an upright transport position, the improvement residing in transport means for connecting the cutting mechanism to the drag bar in said transport position, comprising: a pair of links of substantially equal length, each link having first and second opposite ends and said links being arranged with their first ends proximate, means articulately interconnecting the links at their first ends for extension of the links between the drag bar and a portion of the upright cutting mechanism spaced from its pivot to the drag bar, and said second ends of the links respectively having means thereon detachably connectible respectively to the drag bar and to said portion of the upright cutting mechanism to sustain said upright cutting mechanism in its transport position and against downward pivoting relative to the drag bar, said links being detachable from the drag bar and cutting mechanism for folding about the articulate means.

8. In a mower having a frame and cutting mechanism pivoted to the frame for disposition in an upright transport position, the improvement residing in transport means for connecting the upright-positioned cutting mechanism to the frame, comprising: a pair of links of substantially equal length, each link having first and second opposite ends and said links being arranged with their first ends proximate, means articulately interconnecting the links at their first ends for extension of the links between the frame and a portion of the upright cutting mechanism spaced from its pivot to the frame, and said second ends of the links respectively having means thereon detachably connectible respectively to the frame and to said portion of the upright cutting mechanism to sustain said upright cutting mechanism in its transport position and against downward pivoting relative to the frame, said links being detachable from the frame and cutting mechanism for folding about the articulate means.

9. The invention defined in claim 8 further characterized in that the frame includes a member that is hollow and open at one end and of such length as to afford a receptacle for storage of the folded links, said member further including releasable means engageable with the stored links for retaining said links against loss.

10. In a tractor-mower organization in which the tractor has fore-and-aft draft structure and the mower has a supporting frame connected to the draft structure and cutting mechanism pivoted to the supporting frame for swinging rearwardly from a normal transverse operating position to a rearward released position, the improvement comprising: a bracket engaging the draft structure ahead of the cutting mechanism; overload-release means normally connecting the cutting mechanism to the bracket for holding said mechanism in its operating position and operative in response to overload on the cutting mechanism to enable the cutting mechanism to swing rearwardly and fore-and-aft brace means connected between the bracket and the supporting frame for preventing rearward displacement of the bracket relative to the draft structure by rearwardly directed loads applied to the cutting mechanism.

11. In a tractor-mower organization in which the tractor has laterally spaced apart rearwardly extending draft links provided respectively with first and second hitch points in transverse alinement and the mower has a supporting frame provided with first and second hitch elements respectively alined and detachably connected to the first and second hitch points and cutting mechanism pivoted to the frame on an upright pivot adjacent to the first hitch element for horizontal swingability between a transverse operating position and a swungback position, the improvement comprising: a bracket; means detachably mounting the bracket on a forward part of the second draft link; overload-release means having a first member connected to the bracket and a second member connected to the cutting mechanism in laterally spaced relation to the upright pivot, said members being normally contracted to maintain the operating position of said mechanism but capacitated to release in response to overload forces applied rearwardly to the cutting mechanism; and a brace member extending fore-and-aft and having front and rear ends connected respectively to the bracket and to the supporting frame for holding the bracket against rearward displacement on the second draft link.

12. The invention defined in claim 11, in which: the bracket has upper and lower portions apertured in alinement and extending respectively above and below the second draft link; and the means detachably mounting the bracket on the second draft link includes an anti-sway brace having a rear end connected to the supporting frame adjacent to the first hitch element and a forward end received in the alined apertures of the bracket.

13. The invention defined in claim 11, in which: the cutting mechanism is additionally connected to the supporting frame for adjustment about a transverse pivot; an upright arm is rigid on the cutting mechanism substantially in fore-and-aft alinement with the second draft link; and a fore-and-aft adjustable element is connected at its rear end to the arm and at its front end to the overload-release means independently of the second draft link.

14. A mower for use with a tractor having rearwardly mounted three-point hitch means including first and second lower draft links extending rearwardly to transversely alined rear ends affording first and second hitch points and a third hitch point on the rear of the tractor at a level above the first and second hitch points, said mower comprising: a transverse supporting frame positioned transversely and horizontally behind the tractor and having first and second hitch elements upstanding therefrom and respectively alined with the first and second hitch points to dispose the frame at a level appreciably below the first and second hitch points; first and second means respectively on the first and second hitch elements, including pivots alined on a transverse axis, effecting a draft connection of said elements to the first and second hitch points; means on the frame for connection to the third hitch point cutting mechanism pivoted to the frame for rearward release from a normal operating position; and overload-release means normally connecting the cutting mechanism to the second draft link and exclusively of the tractor for holding said mechanism in its operative position.

15. A mower attachment for use with a tractor having rear-mounted vertically and laterally flexible draft linkage affording first and second lower hitch points and at least one upper hitch point, said mower attachment comprising: a mower frame in the form of an inverted T, having a lower transverse member and a rigid upright member, said upright member having means connectible to the upper hitch point and said frame being positioned transversely and behind the draft structure and said transverse member having opposite ends and each end having an upstanding hitch element thereon cooperative with the respective lower hitch point; a pair of connecting means respectively articulately interconnecting the hitch elements and the lower hitch points to dispose the transverse member at a level below and to the rear of the lower hitch points; cutting mechanism connected to the transverse frame member on an upright pivot adjacent to one end of said transverse member; overload-release means connected to the cutting mechanism and to one of the draft linkage independently of the tractor for normally holding the cutting mechanism against rearward movement about said upright pivot; and diagonal brace means having a rear end connected to the transverse frame member at one end thereof and a forward end connected to the opposite side of the draft linkage independently of the tractor to stabilize the linkage against lateral flexibility.

16. In a tractor-mower outfit in which the tractor has a rear power take-off shaft and the mower is connected to the tractor by flexible multi-link draft linkage having lower draft links and at least one top link at levels respectively below and above that of the power take-off shaft and drive means extends between the power take-off and the mowers intermediate the upper and lower links, the improvement comprising: shield means carried exclusively by the upper link and overlying the drive means.

17. In a tractor-implement outfit in which the tractor has a rear power take-off shaft and the implement is connected to the tractor by flexible multi-link draft linkage having laterally spaced apart lower links and at least one top link at levels respectively below that of the power take-off shaft and drive means extending between the power take-off shaft and the implement at a level intermediate the upper and lower links, the improvement comprising shield means carried exclusively by the upper link and overlying the drive means.

References Cited in the file of this patent

UNITED STATES PATENTS

| | | |
|---|---|---|
| 2,172,987 | Mott | Sept. 12, 1939 |
| 2,248,022 | Geraldson | July 1, 1941 |
| 2,269,980 | MacDonald | June 13, 1942 |
| 2,387,070 | Hilblom | Oct. 16, 1945 |
| 2,533,804 | Hitchcock | Dec. 12, 1950 |

(Other references on following page)

UNITED STATES PATENTS

| | | |
|---|---|---|
| 2,574,691 | Coultas et al. | Nov. 13, 1951 |
| 2,579,274 | Rickey | Dec. 18, 1951 |
| 2,580,266 | Abgarian | Dec. 25, 1951 |
| 2,596,641 | Bert et al. | May 13, 1952 |
| 2,637,966 | Rickey | May 12, 1953 |
| 2,645,890 | Spedding | July 21, 1953 |
| 2,663,134 | Bodine | Dec. 22, 1953 |
| 2,669,825 | Preble et al. | Feb. 23, 1954 |
| 2,670,583 | Hintz et al. | Mar. 2, 1954 |
| 2,686,999 | Smith | Aug. 24, 1954 |
| 2,700,860 | Barber | Feb. 1, 1955 |
| 2,703,954 | Preble et al. | Mar. 15, 1955 |